(12) United States Patent
He et al.

(10) Patent No.: US 8,842,785 B2
(45) Date of Patent: Sep. 23, 2014

(54) SOFT SCALING METHOD AND APPARATUS

(75) Inventors: Ning He, Sollentuna (SE); Håkan B. Björkegren, Täby (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1532 days.

(21) Appl. No.: 12/165,708

(22) Filed: Jul. 1, 2008

(65) Prior Publication Data
US 2010/0002813 A1 Jan. 7, 2010

(51) Int. Cl.
*H04B 1/10* (2006.01)
*H04B 1/7097* (2011.01)

(52) U.S. Cl.
CPC .................................. *H04B 1/7097* (2013.01)
USPC ............ 375/346; 375/316; 375/348; 375/350

(58) Field of Classification Search
USPC ............... 375/346, 285; 455/296, 63.1, 67.11
See application file for complete search history.

(56) References Cited

U.S. PATENT DOCUMENTS

| | | | |
|---|---|---|---|
| 6,144,861 A | 11/2000 | Sundelin et al. | |
| 7,149,476 B2 * | 12/2006 | Shah | 455/67.11 |
| 7,876,810 B2 * | 1/2011 | McCloud et al. | 375/285 |
| 7,912,476 B2 * | 3/2011 | Kwon et al. | 455/67.11 |
| 2004/0042569 A1 * | 3/2004 | Casabona et al. | 375/346 |
| 2004/0146126 A1 * | 7/2004 | Wheatley et al. | 375/343 |
| 2004/0247058 A1 * | 12/2004 | Abraham | 375/346 |
| 2006/0116081 A1 | 6/2006 | Shah | |
| 2006/0227854 A1 | 10/2006 | McCloud et al. | |
| 2006/0291543 A1 | 12/2006 | Fulghum et al. | |
| 2008/0292032 A1 * | 11/2008 | Belogolovy et al. | 375/346 |

FOREIGN PATENT DOCUMENTS

| | | |
|---|---|---|
| EP | 1484933 A1 | 12/2004 |
| RU | 2226316 C2 | 3/2004 |

OTHER PUBLICATIONS

Bottomley, G. E. et al. "A Generalized RAKE Receiver for Interference Suppression." IEEE Journal on Selected Areas in Communications, vol. 18, No. 8, Aug. 2000, pp. 1536-1545.

* cited by examiner

*Primary Examiner* — Sam K Ahn
*Assistant Examiner* — Janice Tieu
(74) *Attorney, Agent, or Firm* — Coats & Bennett, PLLC

(57) ABSTRACT

A received signal of interest is processed by determining timing of interference spikes in the received signal of interest. Receivers can determine when certain types of interference spikes are expected to occur, e.g., based on when different users are scheduled to transmit data during an overlapping portion of the same transmission time interval. The interference timing information is used by the receiver to soft scale signal values recovered from the received signal of interest that coincide with the interference spikes separately from remaining ones of the signal values. This way, fast changing interference power can be accurately tracked during periods of known interference spikes while also accurately tracking slower changing interference power during other periods.

24 Claims, 4 Drawing Sheets

SOFT SCALING METHOD AND APPARATUS

TECHNICAL FIELD

The present invention generally relates to soft scaling in communication signal processing, and more particularly relates to soft scaling based on the timing of interference.

BACKGROUND

CDMA systems operating with high data rates loose some of their inherent protection against intra-cell and inter-cell interference as the spreading gain is reduced when the spreading factor is lowered. Direct Sequence CDMA (DS-CDMA) systems such as those compatible with Rel6 and Rel7 of the Wideband CDMA (WCDMA) standard and EV-DO (Evolution-Data Optimized) based systems are designed to use CDMA for robustly combating interference. Intra-cell interference is particularly troublesome in the uplink direction (i.e., the transmission path from a mobile station to a base station) as then uplink transmission is unsynchronized. Inter-cell interference can be reduced by employing a Time-Division Multiplexing Access (TDMA) method in the uplink direction. WCDMA allows for TDMA in a loose sense in that users can be synchronized in the downlink direction (i.e., the transmission path from a base station to a mobile station to) in a TDMA-like manner with a resolution of 256 chips where a chip is the fundamental unit of transmission in CDMA systems. Users in the uplink direction can then be scheduled in a TDMA-like manner by spacing different user uplink transmissions apart in time. Loose TDMA scheduling enables high data rates in the uplink direction while attaining very high spectral efficiency (assuming full buffer traffic).

However, as recognized by Applicants, multiple user transmissions can overlap during a fraction of the same transmission time interval (TTI) under some conditions. The signal overlap occurs at the beginning and/or end of the TTI, causing very high interference spikes. A similar situation occurs when a multi-user detection receiver is used, where interference associated with one or more radio links is cancelled before detecting and decoding the signal of a particular user. The cancellation efficiency depends on how well the interference signals associated with other radio links are regenerated, which in turn depends on the decoding performance of the radio links. During time intervals when the cancellation efficiency is low, the decoding of the user signal of interest may be subject to very high interference spikes.

Receivers account for interference by soft scaling received signals. Soft scaling is a confidence weighting technique that accounts for the level of interference present in a received signal. The higher the interference, the less reliable the signal values of the received signal and thus less weight given to the signal values. The opposite applies when interference is lower because the received signal values are more reliable. Automatic gain control (AGC) is one type of soft scaling technique. AGC involves increasing receiver dynamic range by scaling received signal values to a predefined level. Maximum ratio combining (MRC) is another soft scaling approach where received baseband signals are propagated via multiple channels and antennas with the goal of maximizing the combiner output signal-to-noise (plus interference) ratio. More advanced receivers such as the G-RAKE (Generalized RAKE) weight signals with an impairment correlation matrix which is a function of the received interference power.

With each of these soft scaling approaches, scaling factors or weights are usually determined based on measurements of the received signals within a predefined averaging period. Interference is smoothed over a long time period when a large averaging period is used. However, a large averaging period yields scaling factors that are insensitive to instantaneous or fast changing interference spikes. Moreover, the receiver slowly adapts to interference spikes when a large averaging period is employed, causing performance loss due to incorrect or biased scaling. On the other hand, a small averaging period more accurately captures the influence of fast changing interference spikes. However a small averaging period causes more fluctuation in the signal scaling factors when interference spikes are not present or dominant. Filtering can be used to smooth out interference for recovering the desired signal. However, when the interference is pulsed and very strong, filtering propagates the interferer over the useful signal samples even though the signal samples were not polluted by the interferer prior to filtering. Accordingly, estimating fast changing interference makes accurate soft scaling very challenging.

SUMMARY

According to the methods and apparatus taught herein, a received signal of interest is processed by determining timing of interference spikes in the received signal of interest. Receivers can determine when certain types of interference spikes are expected to occur, e.g., based on when different users are scheduled to transmit data during an overlapping portion of the same transmission time interval or when the interference cancellation efficiency changes significantly. The interference timing information is used by the receiver to soft scale signal values recovered from the received signal of interest that coincide with the interference spikes separately from remaining ones of the signal values. This way, fast changing interference power can be accurately tracked during periods of known interference spikes while also accurately tracking slower changing interference power during other periods.

In one embodiment, the soft scaling process uses a first interference estimate to weight the signal values of a received signal of interest when interference spikes are not expected to occur in the received signal. The first interference estimate reflects slow changing intra-cell and/or inter-cell interference power and can be averaged over a longer period of time. The soft scaling process employs a second interference estimate for weighting the signal values that coincide with the interference spikes. The second interference estimate reflects fast changing interference power spikes and is not averaged over longer periods of time like the first interference estimate. The soft scaling process reverts back to the first interference estimate each time an interference spike subsides (e.g., by re-initiating the interference estimation process or modifying the preexisting estimate accordingly). Altering the soft scaling process this way allows the receiver to accurately track fast changing interference power during periods of known interference spikes while also accurately tracking slower changing interference power during other periods.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
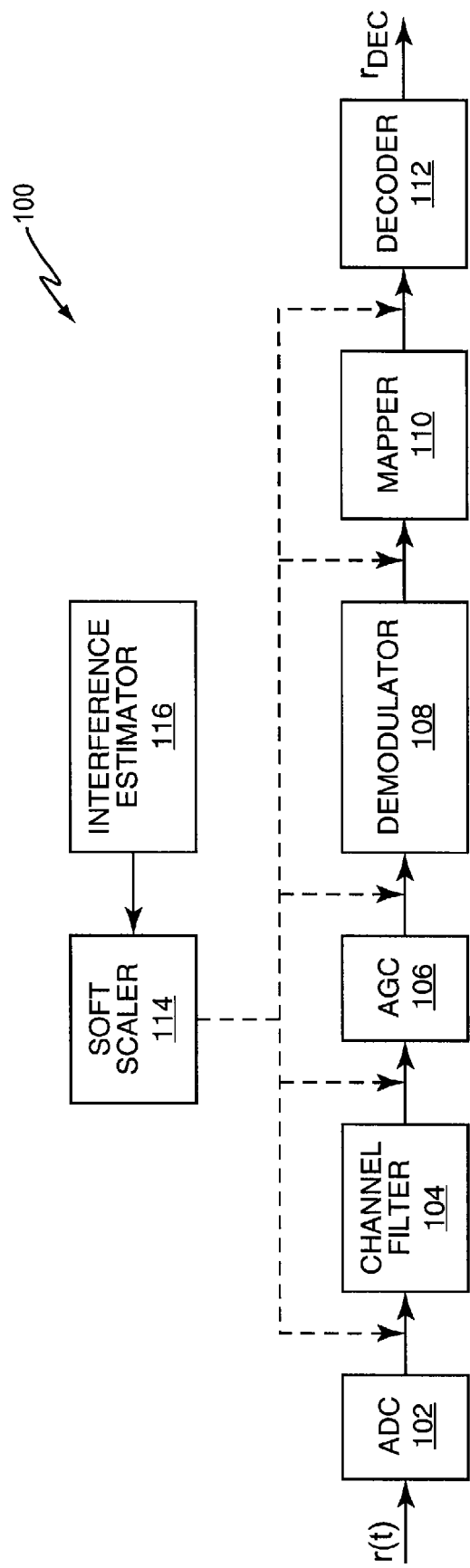
FIG. 1 is a block diagram of an embodiment of a wireless receiver.

FIG. 1 illustrates an embodiment of a receiver 100 included in a wireless communication device such as a base station or a mobile device (not shown). According to this embodiment, the receiver 100 includes an analog-to-digital converter (ADC) 102, channel filter 104, automatic gain control (AGC) block 106, demodulator 108, symbol-to-bit mapper 110, decoder 112, soft scaler 114 and interference estimator 116. The receiver components 102-116 can be implemented in hardware, software or some combination thereof, e.g., using one or more baseband processors, DSPs (digital signal processor), ASICs (application-specific integrated circuit), etc. The receiver 100 recovers signal values from a received signal of interest r(t) and uses the soft scaler 114 to weight the signal values. The signal values can be weighted at any desirable point in the receiver chain as indicated by the dashed lines in FIG. 1. For example, the signal values can be weighted before being input to the channel filter 104. Alternatively, the signal values can be soft scaled before or part of the AGC process. In yet another embodiment, soft scaling can be performed by the demodulator 108, e.g., when the receiver 100 is implemented as a GRAKE (Generalized RAKE) receiver as described later herein. Soft scaling can also be performed after the demodulator 108, e.g., on despread symbol values output by the demodulator 108 or soft bit values output by the symbol-to-bit mapper 110.

In each case, the weighting applied to the signal values depends on whether the received signal of interest is dominated by fast or slow changing interference power at a particular point in time. To this end, the receiver 100 determines the timing of interference spikes present in the received signal of interest, e.g., as illustrated by Step 200 of FIG. 2. In one embodiment, scheduling information known to the receiver 100 can be used to identify which transmission slots are allocated to different users. In addition, chip-level timing information can be used to identify when the interfering users are expected to appear in time. Interference spikes can be expected to occur during periods of signal overlap because multiple user transmissions may occur at the same time. For example, interference spikes can be expected for WCDMA users at the beginning and/or end of the same TTI when the users are loosely scheduled in a TDMA manner as shown in FIG. 3. FIG. 3 shows an example of three different users (USER1, USER2 and USER3) scheduled on a WCDMA uplink. High interferer signals are generated when the users are assigned high data rates, e.g., in accordance with Rel6 or Rel7 of WCDMA. The receiver 100 is aware of when the users are permitted to transmit a signal with a certain power up to a granted limit. The users may be scheduled to transmit in different time intervals, e.g. in different TTIs. In FIG. 3, the third user is scheduled to transmit during time intervals t1 and t4, the second user during time interval t3 and the first user during time interval t2. However, if the users are not aligned (from the receiver's perspective), e.g., due to different propagation delays, the signals transmitted by different ones of the users overlap. For example, FIG. 3 shows that the end of interval t2 overlaps in time with the beginning of interval t3. As such, the end of the last TTI transmission of user 1 interferes with the beginning of the first TTI transmission of user 2 during this overlap period. To the contrary, time intervals t3 and t4 are spaced apart in time, preventing signal overlap between the users. Other user signals may overlap at the beginning and/or end of the TTIs.

Figure 2:
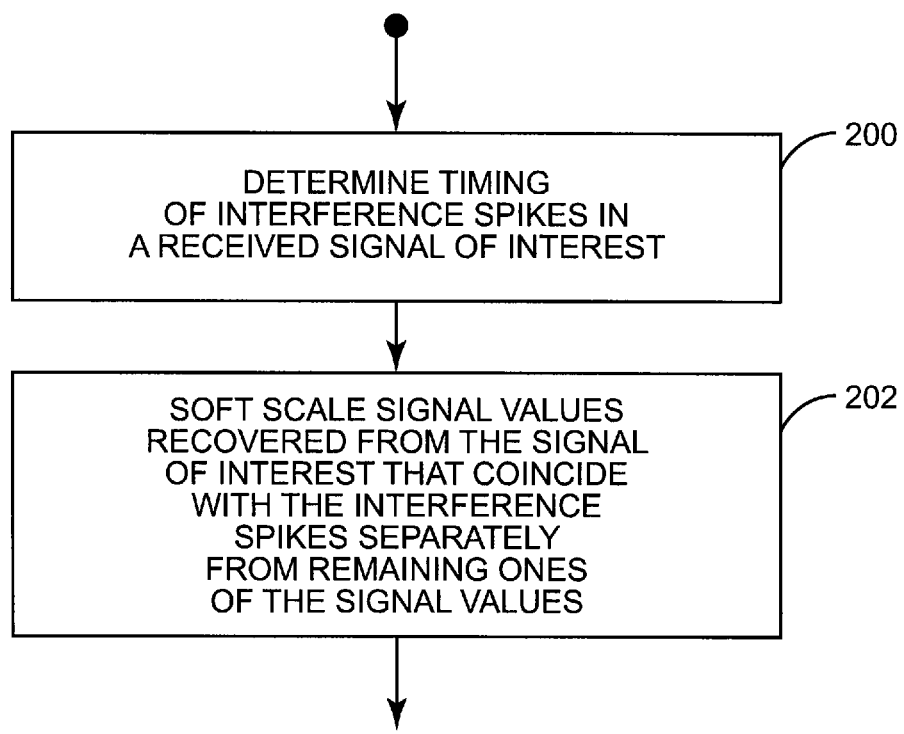
FIG. 2 is a flow diagram of an embodiment of a method for processing a received signal of interest.
Figure 3:
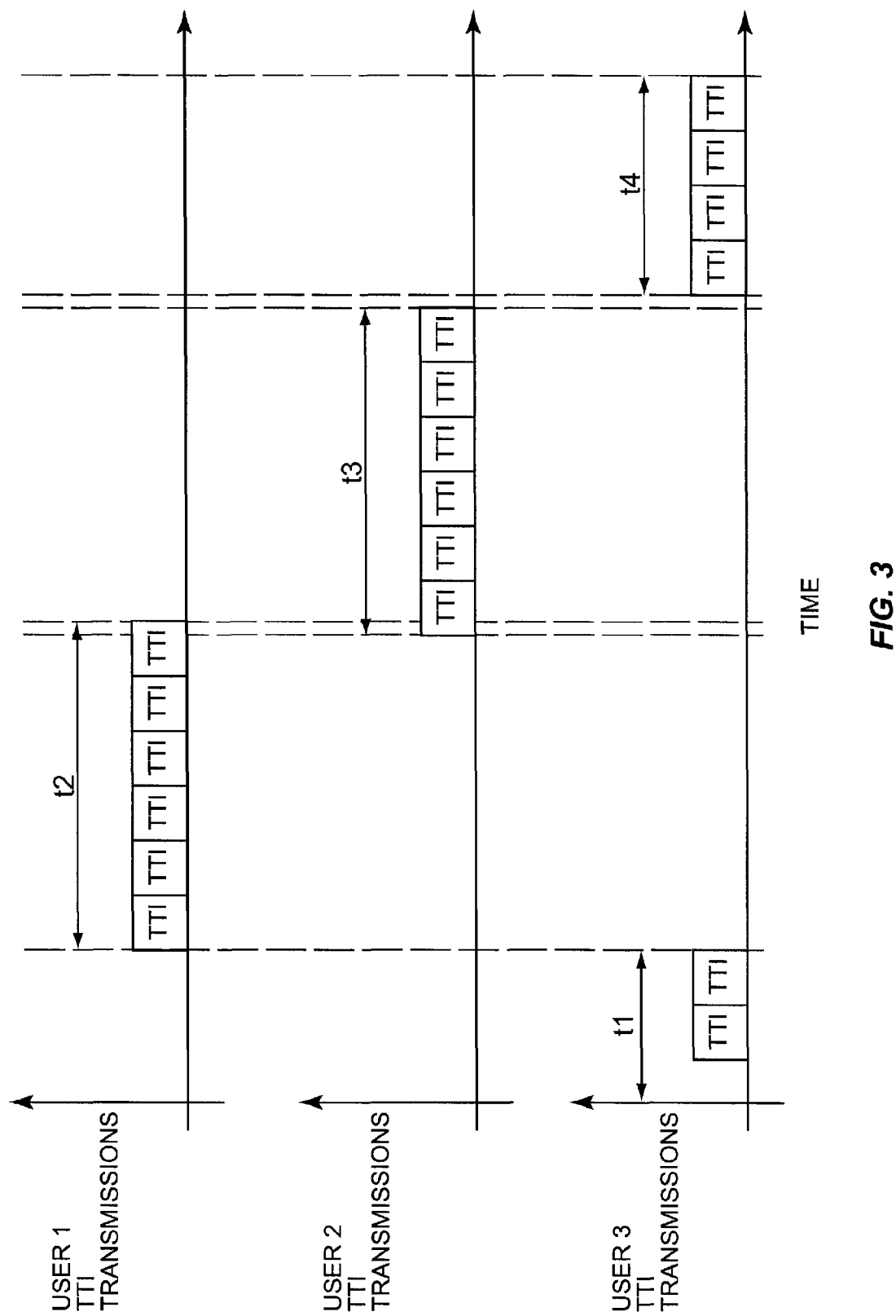
FIG. 3 is a block diagram of TTIs having periods of multi-user overlap.
Figure 4:
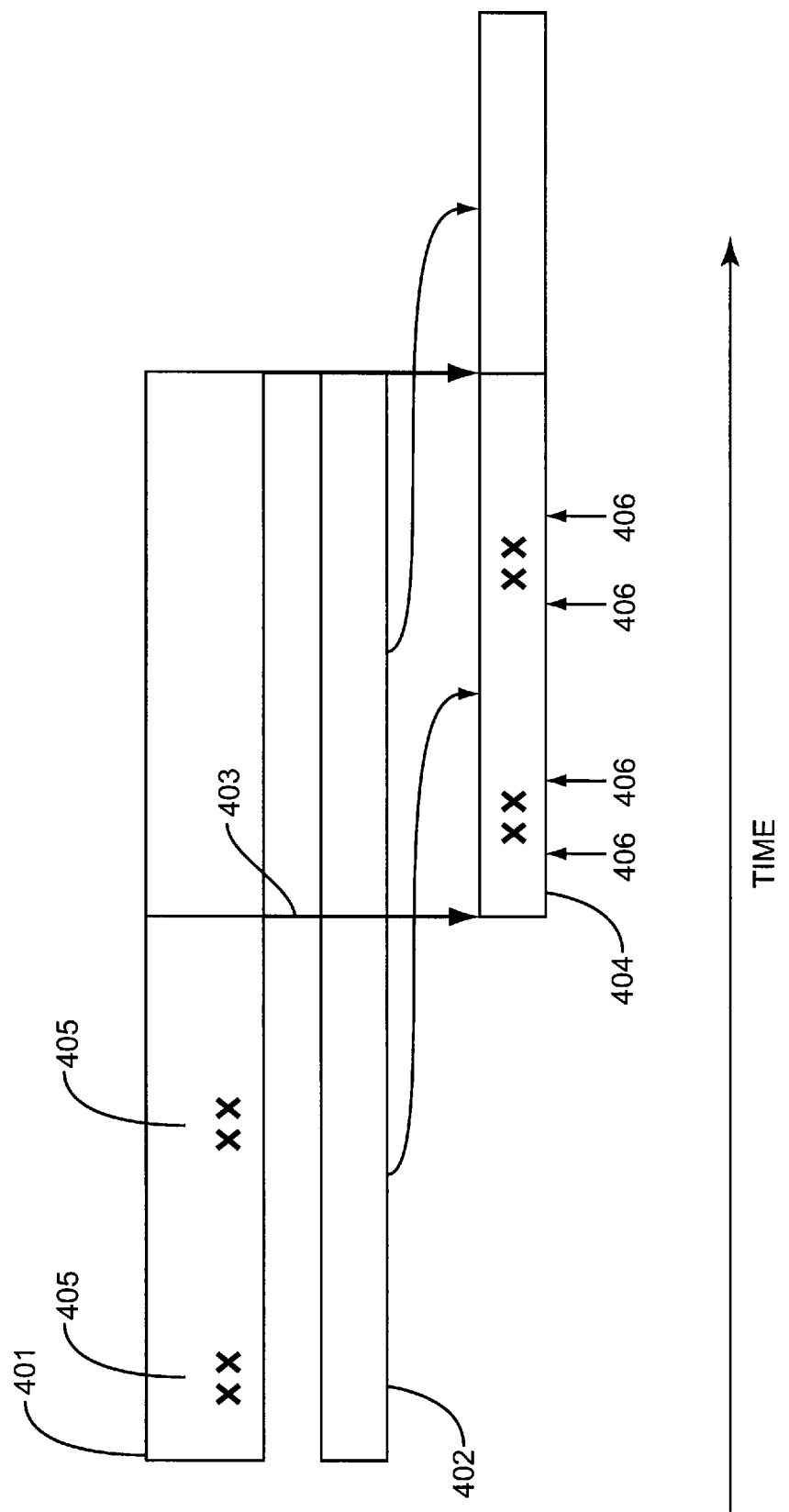
FIG. 4 is a timing diagram illustrating interference spikes that arise in a signal of interest when interference cancellation efficiency changes significantly.

In another embodiment, the receiver 100 identifies when the interference cancellation efficiency changes significantly causing drastic changes in the interference present in the received signal of interest, e.g., as illustrated by Step 200 of FIG. 2. This embodiment is illustrated by FIG. 4, where a signal of an interfering link 401 is decoded, while the received signal including the link of interest 402 is stored. The interfering link 401 is regenerated and cancelled 403 from the stored received signal 404, before detecting and decoding the signal of the link of interest 402. The regeneration of the interfering link 401 depends on the decoding performance. There may be segments 405 of the interfering link 401 that are decoded inefficiently. This will result in corresponding segments 406 of the signal of the link of interest 402, which are subject to interference spikes.

The receiver 100 is aware of the user scheduling and the interference cancellation efficiency, and uses this information to determine when interference spikes are expected. The receiver 100 uses the interference spike timing information to adjust how signal values recovered from a received signal of interest are weighted by the soft scaler 114. The signal values that coincide with interference spikes are soft scaled separately from remaining ones of the signal values, e.g., as illustrated by Step 202 of FIG. 2. This way, the receiver 100 accurately accounts for known interference spikes during periods of fast changing interference power without adversely affecting receiver performance during periods of slower-changing interference power.

In one embodiment, the signal values are soft scaled based on a first interference estimate averaged over a predetermined period of time when signal transmissions associated with the user of interest are not scheduled to overlap with signal transmissions associated with another user. The signal values are soft scaled using a second interference estimate when the different user signal transmissions are scheduled to overlap. In one embodiment, the signal values that coincide with a known interference spike are soft scaled by estimating signal power of the different users and calculating the second interference estimate based on the different signal power estimates. For example, the second interference estimate can be based on signal-to-interference (plus noise) ratios (SIRs) calculated for different interfering users from the signal power estimates.

In one embodiment, the first interference estimate is given by:

$$I1 = N0 + I0 \quad (1)$$

where N0 is a thermal noise estimate and I0 represents slow-varying interference. The second interference estimate can then be calculated based on:

$$I2 = I1 + \frac{Ec}{\alpha} \quad (2)$$

where Ec is a power estimate for an interfering user and $\alpha$ is a known quantity related to the ability of the receiver 100 to suppress interference, e.g., spreading gain. The signal power of the different users can be estimated based on a maximum data rate assigned to the different users. In one embodiment, the receiver 100 estimates power of a given user based on the data rate allocated to the user and the interference level. For example, the receiver 100 knows what power is needed to achieve a certain quality for allocated rate. In another embodiment, the receiver 100 can estimate user power based on what has been scheduled.

That is, a particular SIR(rate) is needed to achieve a certain data transmission rate. The receiver 100 sets the "background" interference to the first interference estimate I1. The power estimate Ec of the interferer becomes:

$$Ec = SIR(\text{rate}) * I1 \tag{3}$$

The second interference estimate I2 (i.e., the interference during a "spike") can then be calculated as given by:

$$I2 = I1 + \frac{SIR(\text{rate}) * I1}{\alpha} \tag{4}$$

Soft scaling is then applied by multiplying the received signal values with $$\frac{I1}{I2}$$

during the time interval corresponding to an interference spike, e.g., during the overlap between time intervals t2 and t3 in FIG. 3.

The amount of soft scaling is determined based on the ratio of $$\frac{I1}{I2}.$$

When the data rate of interference is small, equation (4) reduces to I1=I2 and no extra scaling is applied during the overlapping intervals. When the data rate of the interference is high, I2 is very large. Thus, $$\frac{I1}{I2} \cong 0$$

and the soft values can be set to zero during the overlapping intervals. This approach improves the accuracy of the decoder output for interference spikes of short duration. Interference spikes of longer duration can be handled in other ways as disclosed herein to prevent the receiver 100 from zeroing out too many signal values and causing the decoder 112 to generate decoding errors.

When the data rate of the desired user and the data rate of the interference are similar, the power estimate of the interfering user $Ec_{interferer}$ is approximately equal to that of the user of interest $Ec_{interest}$. Under these conditions, equation (4) becomes:

$$I2 = I1 + \frac{Ec_{interest}}{\alpha} \tag{5}$$

Correspondingly, the amount of scaling can be determined by:

$$\frac{I1}{I2} = \frac{I1}{I1 + \frac{Ec_{interest}}{\alpha}} = \frac{1}{1 + \frac{SIR(\text{rate})}{\alpha}} \tag{6}$$

In each of these embodiments, the receiver 100 weights the signal values that coincide with an interference spike in accordance with the signal power estimates.

The receiver 100 can be implemented as a GRAKE receiver or other type of receiver such as a RAKE, DFE (Decision-Feedback Equalizer), chip equalizer, whitening matched filter, etc. GRAKE receivers combine despread signal values to cancel interference and increase the desired signal component. The despread signal values are combined using combining weights. Channel estimates and impairment correlation estimates are used to form the combining weights. As a result, the combining process collects signal energy and suppresses interference. The combining weights are typically optimized for performance, maximizing SIR. In a GRAKE embodiment, the combining weights can be expressed as a vector given by:

$$w = R^{-1}c \tag{7}$$

where c is a vector of estimated channel coefficients and R is a matrix of estimated impairment correlations. GRAKE receivers tend to provide near ideal soft-scaling whenever the impairment correlation matrix R is accurate. However, it becomes difficult to capture fast-changing interference in the impairment correlation matrix R.

Thus, the impairment correlation matrix R can be used as the first interference estimate for periods of slow changing interference power according to one embodiment as given by:

$$I1 = w^H R_{slow} w \tag{8}$$

where the impairment correlation matrix $R_{slow}$ is calculated prior to an interference spike. The receiver 100 re-calculates the impairment correlation matrix $R_{slow}$ anew each time an interference spike subsides. This way, signal values coinciding with known interference spikes are not used to calculate or update the impairment correlation matrix. Instead, the impairment correlation matrix $R_{slow}$ is computed based on the signal values that do not coincide with known interference spikes.

When a known interference spike occurs, the receiver 100 stops updating the impairment correlation matrix $R_{slow}$. The impairment correlation matrix $R_{slow}$ is then used to compute the combining weights for the signal values received prior to the spike. In one embodiment, the impairment correlation estimation process is re-initiated anew with the signal values that coincide with the spike. The new impairment correlation matrix $R_{spike}$ is used to compute the combining weights for the signal values coinciding with the spike. The new impairment correlation matrix $R_{spike}$ can also be used to calculate the second interference estimate as given by:

$$I2 = w^H R_{spike} w \tag{9}$$

This way, two sets of combining weights are calculated each with a different impairment correlation matrix $R_{slow}$, $R_{spike}$. The impairment correlation estimation process is re-initiated each time the receiver 100 determines an interference spike has occurred. As a result, signal values coinciding with interference spikes are not commingled with those that do not when computing the different impairment correlation matrices $R_{slow}$, $R_{spike}$.

In another embodiment, the impairment correlation estimation process is halted when an interference spike occurs. The signal values coinciding with the interference spike are soft scaled using combining weights computed using an interference estimate other than the impairment correlation matrix $R_{slow}$, e.g., as previously described herein. In one embodiment, the interference spike may be treated as infinite in value, causing the signal values coinciding with the interference spike to be zeroed out (i.e., the GRAKE combining weights are zero). Alternatively, the interference estimate can be calculated based on received power estimates when available. In each case, the receiver 100 accurately tracks fast changing interference power during periods of known interference spikes while also accurately tracking slower changing interference power during other periods using the soft scaling techniques disclosed herein.

As discussed above, soft scaling can be performed at any point in the receiver chain. In one embodiment, soft scaling is applied before the decoder 112 when the interference power is changing slowly as compared to the bandwidth of the carrier. In another embodiment, soft scaling is applied before the channel filter 104 when the interference changes more quickly. According to this embodiment, the signal values are scaled prior to the channel filter 104 for preventing the interferer signal from propagating further into the receiver chain over "clean" samples. This can be done by zeroing the signal values as explained above. Zeroing the signal values before the channel filter 104 is advantageous when the interferer signal is relatively strong compared to the useful signal and the interferer period is relatively short such that the lost (zeroed) samples can be later recovered, e.g., by the decoder 112. Alternatively, signal values coinciding with interference spikes can be scaled down instead of being completely zeroed out when the interferer signal is not as strong or there are too many infected samples (which may result in decoding errors when too many signal values are completely zeroed out). In another embodiment, soft scaling can be done after the channel filter 104 using the channel filter coefficients, thereby minimizing the impact of the filtering. In yet another embodiment, soft scaling is performed after despreading by demodulator 108.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of processing a received signal of interest, comprising:
   determining timing of interference spikes in the received signal of interest; and
   soft scaling, in a digital domain, signal values recovered from the received signal of interest that coincide with the interference spikes separately from remaining ones of the signal values.

2. The method of claim 1, wherein determining the timing of the interference spikes comprises identifying when signal transmissions associated with a user of interest are scheduled to overlap with signal transmissions associated with one or more other users.

3. The method of claim 2, wherein soft scaling, in the digital domain, the signal values that coincide with the interference spikes separately from the remaining ones of the signal values comprises:
   soft scaling, in the digital domain, the signal values based on a first interference estimate averaged over a predetermined period of time when the signal transmissions associated with the user of interest are not scheduled to overlap with the signal transmissions associated with the one or more other users; and
   soft scaling, in the digital domain, the signal values based on a second interference estimate when the signal transmissions associated with the user of interest are scheduled to overlap with the signal transmissions associated with the one or more other users.

4. The method of claim 3, comprising:
   estimating signal power of the users; and
   calculating the second interference estimate based on the signal power estimates.

5. The method of claim 4, wherein estimating signal power of the users comprises estimating the signal power of the users based on a maximum data rate assigned to the users.

6. The method of claim 4, wherein estimating signal power of the users comprises assigning approximately the same signal power level to each of the users.

7. The method of claim 3, comprising calculating the first interference estimate based on an impairment correlation estimate.

8. The method of claim 7, wherein calculating the first interference estimate based on an impairment correlation estimate comprises re-calculating the first interference estimate based on a new impairment correlation estimate each time one of the interference spikes subsides.

9. The method of claim 7, comprising calculating the second interference estimate based on a second impairment correlation estimate calculated from the signal values that coincide with one of the interference spikes.

10. The method of claim 1, wherein soft scaling, in the digital domain, the signal values that coincide with the interference spikes separately from the remaining ones of the signal values comprises zeroing out the signal values that coincide with the interference spikes.

11. The method of claim 1, comprising soft scaling, in the digital domain, the signal values before the signal values are filtered using a channel filter.

12. The method of claim 1, wherein determining the timing of the interference spikes comprises identifying when interference cancellation efficiency associated with one or more interfering signals changes significantly.

13. A wireless communication device comprising:
   a receiver comprising:
      a interference estimator configured to determine timing of interference spikes in a received signal of interest; and
      a scaler connected to the interference estimator and configured to soft scale, in the digital domain, signal values recovered from the received signal of interest that coincide with the interference spikes separately from remaining ones of the signal values.

14. The wireless communication device of claim 13, wherein the receiver is configured to identify when signal transmissions associated with a user of interest are scheduled to overlap with signal transmissions associated with one or more other users.

15. The wireless communication device of claim 14, wherein the scaler is further configured to:
   soft scale, in the digital domain, the signal values based on a first interference estimate averaged over a predetermined period of time when the signal transmissions associated with the user of interest are not scheduled to overlap with the signal transmissions associated with the one or more other users; and
   soft scale, in the digital domain, the signal values based on a second interference estimate when the signal transmissions associated with the user of interest are scheduled to overlap with the signal transmissions associated with the one or more other users.

16. The wireless communication device of claim 15, wherein the receiver is configured to:
   estimate signal power of the users; and
   calculate the second interference estimate based on the signal power estimates.

17. The wireless communication device of claim 16, wherein the receiver is configured to estimate the signal power of the users based on a maximum data rate assigned to the users.

18. The wireless communication device of claim 16, wherein the receiver is configured to assign approximately the same signal power level to each of the users.

19. The wireless communication device of claim 15, wherein the receiver is configured to calculate the first interference estimate based on an impairment correlation estimate.

20. The wireless communication device of claim 19, wherein the receiver is configured to re-calculate the first interference estimate based on a new impairment correlation estimate each time one of the interference spikes subsides.

21. The wireless communication device of claim 19, wherein the receiver is configured to calculate the second interference estimate based on a second impairment correlation estimate calculated from the signal values that coincide with one of the interference spikes.

22. The wireless communication device of claim 13, wherein the receiver is configured to zero out the signal values that coincide with the interference spikes.

23. The wireless communication device of claim 13, further comprising a channel filter, and wherein the scaler is further configured to soft scale, in the digital domain, the signal values before filtering the signal values using the channel filter.

24. A wireless communication device comprising:
   an interference estimator configured to determine timing of interference spikes in a received signal of interest; and
   a scaler connected to the interference estimator and configured to soft scale, in the digital domain, signal values recovered from the received signal of interest that coincide with the interference spikes separately from remaining ones of the signal values.

* * * * *